US011945368B2

(12) United States Patent
Van Stiphout et al.

(10) Patent No.: US 11,945,368 B2
(45) Date of Patent: Apr. 2, 2024

(54) ADJUSTMENT DEVICE FOR AN EXTERNAL VISION UNIT OF A VEHICLE

(71) Applicant: MCi (Mirror Controls International) Netherlands B.V., Woerden (NL)

(72) Inventors: Paulus Gerardus Maria Van Stiphout, Woerden (NL); Hendrik Alfred Simeon De Vries, Schoonhoven (NL); Marinus Jacobus Maria Van Zuilen, Jaarsveld (NL); Emiel Sebastiaan Janssen, The Hague (NL); Anne Catharina Martha Bekker, Alphen aan den Rijn (NL); Tom Adriaan Jansen, Utrecht (NL); Arie Anthony De Kan, Huis ter Heide (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 16 days.

(21) Appl. No.: 17/992,446

(22) Filed: Nov. 22, 2022

(65) Prior Publication Data

US 2023/0158954 A1 May 25, 2023

(30) Foreign Application Priority Data

Nov. 23, 2021 (NL) ...................................... 2029873

(51) Int. Cl.
*B60R 1/072* (2006.01)
*B60R 11/04* (2006.01)

(52) U.S. Cl.
CPC .............. *B60R 1/072* (2013.01); *B60R 11/04* (2013.01)

(58) Field of Classification Search
CPC ................................ B60R 1/072; B60R 11/04
See application file for complete search history.

(56) References Cited

U.S. PATENT DOCUMENTS

| 11,377,032 B2 * | 7/2022 | Harris ..................... B60R 1/074 |
| 2007/0084707 A1 * | 4/2007 | van den Brink ........ B60R 1/074 |
| | | 359/877 |
| 2013/0107386 A1 | 5/2013 | Sobecki et al. |
| 2017/0240114 A1 * | 8/2017 | Brouwer ................. B60R 1/072 |

FOREIGN PATENT DOCUMENTS

| GB | 2244965 A | 12/1991 |
| WO | 2016076713 A1 | 5/2016 |
| WO | 2019226423 A1 | 11/2019 |

\* cited by examiner

*Primary Examiner* — Amy J. Sterling
(74) *Attorney, Agent, or Firm* — Volpe Koenig

(57) ABSTRACT

The disclosure relates to an adjustment device for adjusting an orientation of an external vision element of a vehicle about a first pivot axis and a second pivot axis. The adjustment device comprises a base for coupling to a vehicle; a frame pivotably coupled to the base about a first pivot axis and a second pivot axis; and a drive unit for driving the frame pivotally about the first pivot axis and the second pivot axis. The drive unit comprises a first electromotor connected to a first driven element for driving the frame in rotation about the first pivot axis, and a second electromotor connected to a second driven element for driving the frame in rotation about the second pivot axis. The second electromotor has a lower maximum power consumption compared to a maximum power consumption of the first electromotor.

21 Claims, 5 Drawing Sheets

ADJUSTMENT DEVICE FOR AN EXTERNAL VISION UNIT OF A VEHICLE

CROSS REFERENCE TO RELATED APPLICATION

This application claims the benefit of Netherlands patent application no. 2029873 filed on Nov. 23, 2021, which is incorporated by reference as if fully set forth.

FIELD OF INVENTION

The invention relates to a device for adjusting an orientation of an external vision element, such as an external rear view or side view mirror, or camera, of a vehicle.

BACKGROUND

Adjustment devices for an external vision unit of a vehicle typically include a vision element, such as a mirror, camera, and/or display. They are configured to adjust an orientation of the vision element relative to the vehicle, typically about a horizontal and a vertical axis, such that a driver of the vehicle can fine-tune its rearward view.

An adjustment device can, for example be part of an external vision unit of a vehicle, wherein the vision element is often carried by a frame. The frame is adjustable relative to a base, where the base is configured to be mounted to a body of the vehicle.

Often, the external vision unit is further adjustable between a folded position, or park position, in which the frame extends substantially parallel to the vehicle, and an extended position in which the frame extends substantially outward from the vehicle. This operation is often referred to as power fold actuation. The power fold actuation can be driven by a dedicated power fold actuator, which is separate from a fine-tuning adjustment device for fine tuning the driver's rearward view in the extended position of the external vision unit.

In some instances, an adjustment device may be arranged to fine tune an orientation of the vision element about two respective axes and drive the power fold actuation between the folded position and the extended position. Such adjustment devices may thus be regarded as conventional mirror adjustment devices with additional power fold capabilities or as conventional mirror adjustment devices having a multi-axis power fold actuator. An example of such a device is described in EP3218226, where the adjustment of the vision element is driven by two separate electromotors; a first one for adjustment about the vertical axis and a second one for adjustment about the horizontal axis. However, in such an adjustment device both electromotors need to be relatively powerful because of the relatively high clamping forces required to retain the adjustment device in an adjusted position. This increases the overall cost of the adjustment device, for example in terms of components and manufacturing, but also in terms of the overall form factor and power consumption of the adjustment device in use. Accordingly, a need exists for an adjustment device at reduced costs that can fine tune an orientation of a vision element about two respective axes and drive the power fold actuation between the folded position and the extended position using the power of a single power door control module.

SUMMARY

In an aspect, the invention relates to an adjustment device for adjusting an orientation of a vision element of a vehicle about a first pivot axis and a second pivot axis. The adjustment device comprises a base for coupling to a vehicle and a frame pivotably coupled to the base, the frame having a first frame part being pivotable relative to the base about the first pivot axis and a second frame part being pivotable relative to the first frame part about the second pivot axis. The adjustment device further comprises a drive unit for driving the frame pivotally about the first pivot axis and the second pivot axis. The drive unit comprises a first powertrain operationally between the first frame part and the base, having a first electromotor connected via a first transmission to a first driven element for driving the first frame part relative to the base about the first pivot axis, and a second powertrain operationally between the first frame part and the second frame part, having a second electromotor connected via a second transmission to a second driven element for driving the second frame part relative to the first frame part about the second pivot axis. The second electromotor has a lower power rating compared to a power rating consumption of the first electromotor. The second transmission further applies a second speed-reducing transmission ratio from the second electromotor to the second driven element, the second speed-reducing transmission ratio providing a greater speed reduction than a first transmission ratio from the first electromotor to the first driven element.

Hence, in an aspect, the device comprises a first powertrain, which includes the relatively high-powered first electromotor and the first transmission, dedicated for pivoting the frame about the first pivot axis, and a separate second powertrain, which includes the relatively low-powered second electromotor and the second transmission, dedicated for pivoting the frame about the second pivot axis. Accordingly, the adjustment device includes only a single relatively high-powered electromotor, which enables the adjustment device to be controlled by a modern standard door control module of a vehicle, which has only one high-power control output. The first electromotor having the high-power rating can accordingly be controlled by the only one high-power control output of the modern standard door control module, while second electromotor having the lower power rating can be controlled by a low-power control output of the modern standard door control module.

In an aspect, the invention relates to an external vision unit for a vehicle, comprising the adjustment device for adjusting an orientation of a vision element, as well as the vision element itself, where the external vision unit can be mounted to the frame of a vehicle.

In an aspect, the invention relates to an external vision unit system for a vehicle, comprising the adjustment device for adjusting an orientation of a vision element, the vision element itself, and a door control module operatively connected to the adjustment device for sending a power signal to the adjustment device.

In an aspect, the invention relates to an external vision unit system, comprising a door control module that provides a virtual transmission for the first powertrain, such that the first power train is selectively operable according to at least two virtual transmission ratios, each transmission ratio being associated with a different power signal than the other.

BRIEF DESCRIPTION OF THE DRAWINGS

Embodiments of the present invention will now be described in detail with reference to the accompanying drawings. It is understood, however, that the invention is not limited to the precise arrangements shown. In the drawings.

DETAILED DESCRIPTION OF EMBODIMENTS

It will be appreciated that any of the aspects, features and options described herein can be combined. It will also be appreciated that any of the aspects, features and options described in view of the adjustment device apply equally to the external vision unit and external vision unit system, and vice versa. It will further be appreciated that any of the aspects, features and options described in view of the adjustment device apply equally to a vehicle.

Figure 1:
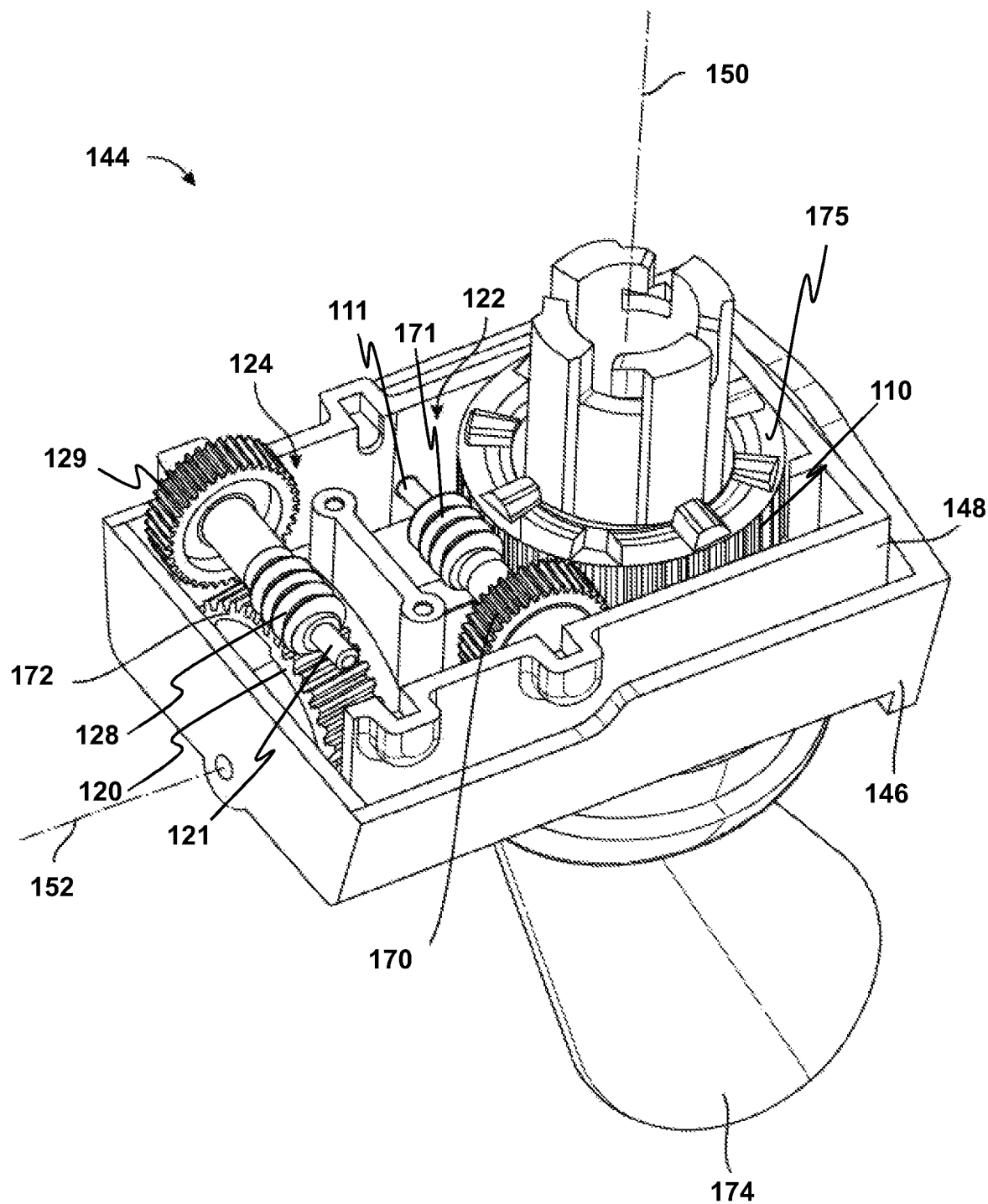
FIG. 1 shows an example of a prior art adjustment device.

FIG. 1 illustrates a prior art adjustment device 144 for an external vision unit. The adjustment device 144 comprises a base 174 for mounting to the body of a motor vehicle, such as a car, and a frame 146, 148 pivotably arranged about the base 174, about a first pivot axis 150. In this example the frame comprises a first frame part 146 and a second frame part 148 both of which are commonly pivotable about the first pivot axis 150. The second frame part 148 is also movably coupled to the first frame part 146 such that the first frame part 146 and second frame part 148 are pivotable relative to each other about a second pivot axis 152. In this example, the first frame part 146 is pivotable relative to the base 174 about the first pivot axis 150 and is not pivotable relative to the base 174 about the second pivot axis 152. Further, the second frame part 148 is pivotable relative to the base 174 about the first pivot axis 150 and the second pivot axis 152. The second frame part 148 is also pivotable relative to the first frame part 146 about the second pivot axis 152.

The prior art adjustment device 144 is arranged to adjust an orientation of the external vision unit about the first pivot axis 150 and the second pivot axis 152, using two identical relatively powerful electromotors to overcome the relatively large clamping forces required to retain the adjustment device 144 in an adjusted position. The two identical relatively powerful electromotors are omitted from FIG. 1 to show the underlying structures, including two substantially identical transmissions 122, 124, respectively associated with the two relatively powerful electromotors. Each transmission 122, 124 has two transmission stages between an associated electromotor output and a respective driven element 110, 120. A first one of the two relatively powerful electromotors adjusts the external vision unit about the first pivot axis 150 and a second one of the relatively powerful electromotors adjusts the external vision unit about the second pivot axis 152. That the two electromotors are required to be relatively powerful adds to the overall cost of the adjustment device, for example in terms of components and manufacturing, but also in terms of the overall form factor and power consumption of the adjustment device 144 when in use.

Figure 2:
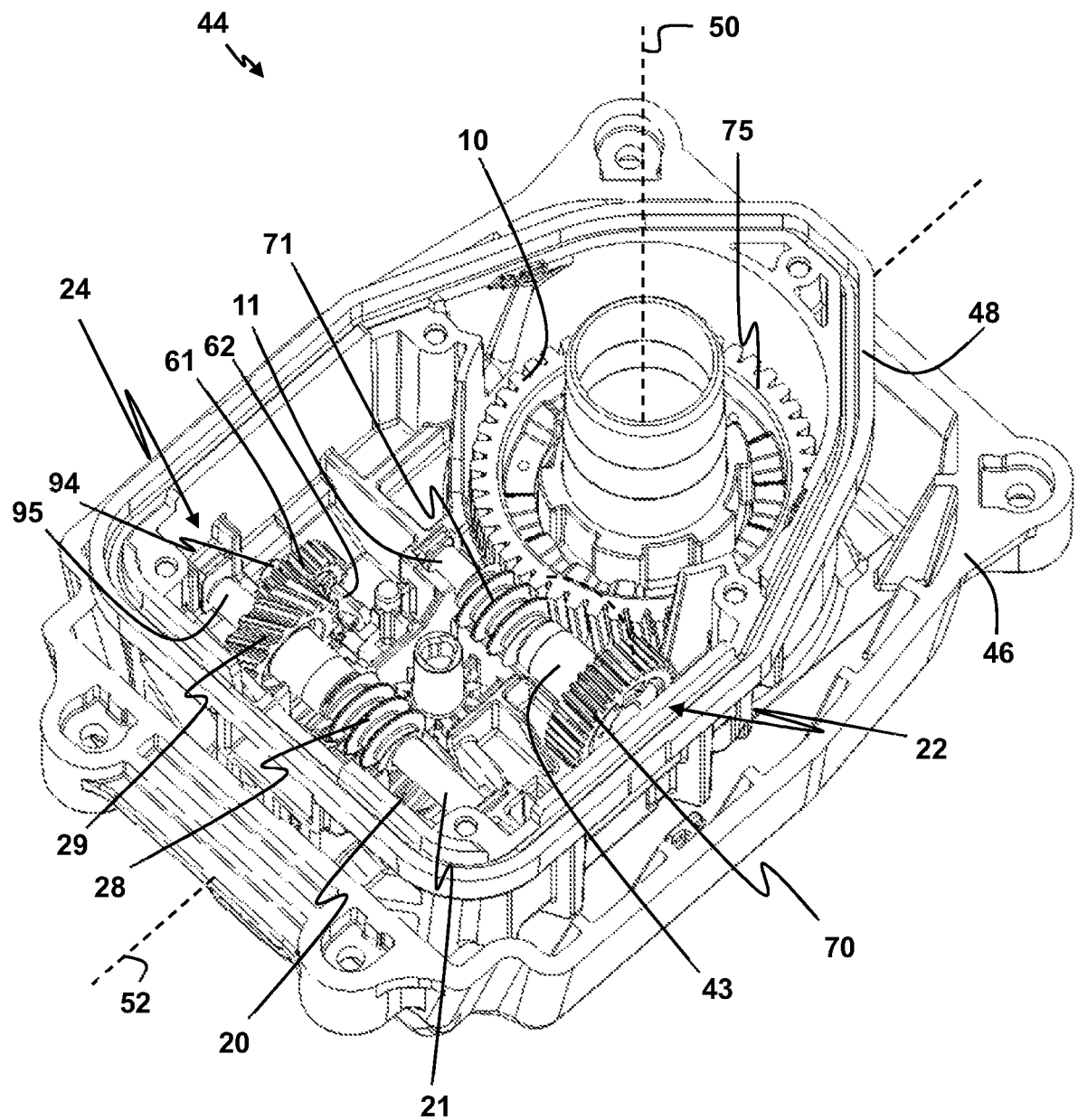
FIG. 2 shows a view of the adjustment device.

FIG. 2 illustrates a perspective view of the of the adjustment device 44 for an external vision unit. In an embodiment, the adjustment device comprises a base 74, which may be mounted to the body of a motor vehicle, such as a car. The adjustment device 44 further comprises a frame 46, 48 which may be pivotably arranged about the base 74 about a first pivot axis 50. In an embodiment, the frame comprises a first frame part 46 and a second frame part 48, both of which may be pivotable about the first pivot axis 50. In an embodiment, the second frame part 48 may also be movably coupled to the first frame part 46. In this example, the first frame part 46 and second frame part 48 may be pivotable relative to each other about a second pivot axis 52. Further, the second frame part 48 may also be pivotable relative to the base 74 about the first pivot axis 50 and the second pivot axis 52. A vision element, such as a mirror, camera or display, may be mounted to the second frame part 48. The vision element is omitted from the figures to show underlying components.

In an embodiment, the adjustment device 44 is movable between a folded position in which the frame 46, 48 extends substantially parallel to the vehicle, and an extended position in which the frame 46, 48 extends substantially outward from the vehicle. FIG. 2 shows the adjustment device 44 in the extended position. In an embodiment, the adjustment device 44 can be moved between the folded and the extended position by pivoting the frame 46, 48 relative to the base 74 about the first pivot axis 50.

The adjustment device 44 further comprises a drive unit, which includes two electrical actuators, for example two electromotors, namely a first electromotor 100 and a second electromotor 200. A first powertrain 23 may include the first electromotor 100 connected by a first transmission 22 to a first driven element 10. In an embodiment, the first driven element 10 is part of the base 74, for example a base gearing 75 integrally formed with the base 74 or rigidly fixed to a remainder of the base 74. In an embodiment, the first powertrain 23 is provided for pivoting the frame 46, 48 relative to the base 74 about the first pivot axis 50.

A second powertrain 25 may include the second electromotor 200 connected by a second transmission 24 to a second driven element 20. In an embodiment, the second driven element 20 may be part of the second frame part 48, for example a gearing 72 integrally formed with the second frame part 48 or rigidly fixed to a remainder of the second frame part 48. In an embodiment, the second powertrain 25 is provided for pivoting the first frame part 46 relative to the second frame part 48 about the second pivot axis 52.

In an embodiment, the first powertrain 23 and the second powertrain 25 are separate from each other.

Figure 3A:
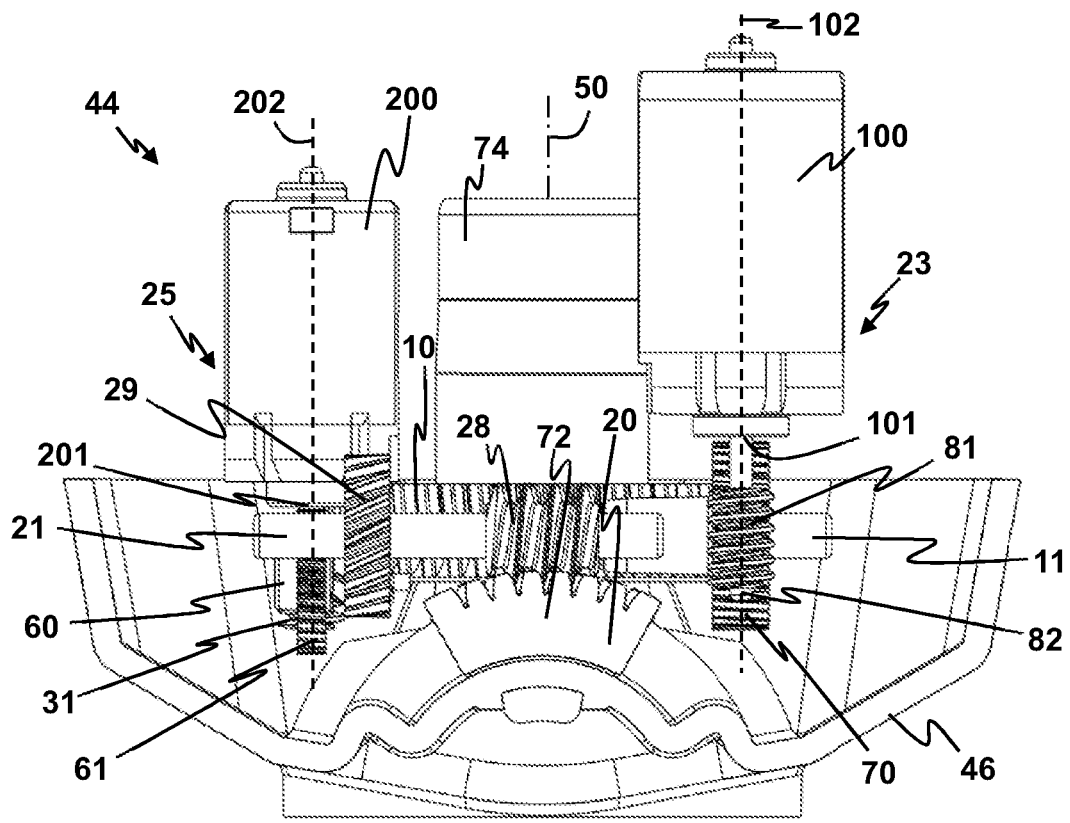
FIG. 3A shows a frontal view of an adjustment device.
Figure 3B:
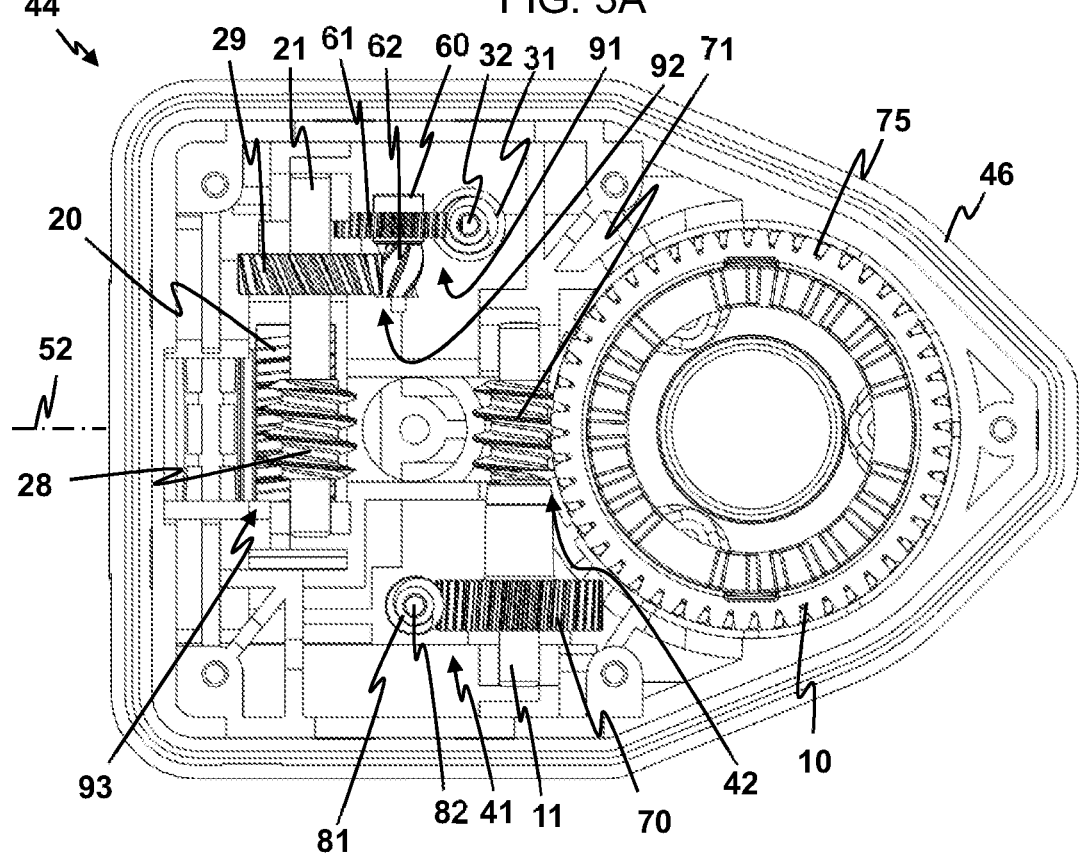
FIG. 3B shows a top view of an adjustment device.

FIG. 3A shows a frontal view of the adjustment device 44, and FIG. 3B shows a top view of the adjustment device 44. Part of the frame 46, 48 has been omitted in the FIG. 3A to show details of the first transmission 22 and the second transmission 24. In FIG. 3B, the electromotors 100, 200 have been omitted to show details of the transmissions 22, 24.

In an embodiment, the first transmission 22 comprises two transmission stages: a first input transmission stage 41, provided between an output of the first electromotor 100 and a first transmission intermediate member 43; and a first output transmission stage 42 provided between the first transmission intermediate member 43 and the first driven element 10.

The output of the first electromotor 101 may include an output shaft 82 of the first electromotor provided with an input worm 81 of the first electromotor. In an embodiment, the input worm 81, which is rotatably driven by the first electromotor 100 via the output shaft 82, meshes with the first worm gear 70 to transfer torque to the intermediate member 43. Movement of the first worm gear 70 drives movement of the intermediate shaft 11 and the first output worm 71 such that the first output worm 71 rotates together with the first worm gear 70, and also meshes with a base gearing 75 of the base 74.

In an embodiment, the first input transmission stage 41 is formed between the input worm 81 and the first worm gear 70, and the first output transmission stage 42 is formed between the first output worm 71 and the base gearing 75.

Compared to the first transmission 22, the second transmission 24 comprises at least an additional transmission stage. In an embodiment, the second transmission 24 comprises at least two transmission stages. In an embodiment, the second transmission 24 comprises at least three transmission stages.

In an embodiment, the second transmission 24 comprises three transmission stages: a second input transmission stage 91, provided between an output 201 of the second electromotor 200 and a second transmission primary intermediate member 94; an intermediate transmission stage 92, provided between the second transmission primary intermediate member 94 and a second transmission secondary intermediate member 95; and a second output transmission stage 93, provided between the second transmission secondary intermediate member 95 and the second driven element 20. The output of the second electromotor 201 may include an output shaft 32 of the second electromotor provided with a second input worm 31. The second transmission primary intermediate member 94 may include a primary intermediate shaft 60 further comprising a primary intermediate worm gear 61 and a primary evoloïd gear 62. The second transmission secondary intermediate member 95 may include a secondary intermediate shaft 21 further comprising a secondary evoloïd gear 29 and a second output worm 28.

In an embodiment, the second input worm 31, which is rotatably driven by the second electromotor 200 via the output shaft 32, meshes with the primary intermediate worm gear 61 to transfer torque to the primary intermediate member 94. Movement of the primary intermediate worm gear 61 drives movement of the primary intermediate shaft 60 and the primary evoloïd gear 62 such that the primary intermediate worm gear 61 rotates together with the primary evoloïd gear 62. The primary evoloïd gear 62 meshes with the secondary evoloïd gear 29 to transfer torque to the secondary intermediate member 95. Movement of the secondary evoloïd gear 29 drives movement of the secondary intermediate shaft 21 and the second output worm 28 such that the secondary evoloïd gear 29 rotates together with the second output worm 28 and meshes with the gearing 72 of the second driven element.

In an embodiment, the second input transmission stage 91 is between the output of the second electromotor 200, here an output shaft 32 provided with a second input worm 31, and a second transmission primary intermediate member 94, here a primary intermediate shaft 60 provided with a primary intermediate worm gear 61 and a primary evoloïd gear 62. The primary intermediate worm gear 61 of the primary intermediate member meshes with the second input worm 31, hence providing the second input transmission stage 91 of the second electromotor 200.

In an embodiment, an intermediate transmission stage 92 is provided between the primary intermediate member 94, here including primary intermediate shaft 60 provided with primary intermediate worm gear 61 and primary evoloïd gear 62, and a second transmission secondary intermediate member 95, here including secondary intermediate shaft 21 provided with secondary evoloïd gear 29 and a second output worm 28. The primary evoloïd gear 62 of the primary intermediate transmission member 94 meshes with the secondary evoloïd gear 29 of the secondary intermediate transmission member 95, hence providing the intermediate transmission stage 92.

In an embodiment, the meshing of primary evoloïd gear 62 and secondary evoloïd gear 29 are effective for applying a large reduction ratio, as the primary evoloïd gear 62 can be given very few teeth. In an embodiment, the primary evoloïd gear 62 has only one tooth. In an embodiment, the primary evoloïd gear 62 has only two teeth. In an embodiment, the primary evoloïd gear 62 has only three teeth.

In an embodiment, a second output transmission stage 93 is provided between the second transmission secondary intermediate member 95, here including secondary intermediate shaft 21 provided with secondary evoloïd gear 29 and a second output worm 28, and the second driven element 20. The second output worm 28, which rotates together with the secondary evoloïd gear 29, meshes with the second driven element 20 here a gearing 72 of the frame 46, 48 to provide the second output transmission stage 93. In an embodiment, the secondary evoloïd gear 29, meshes with the second driven element 20, here a gearing 72 of the second frame part 48, to provide the second output transmission stage 93. In this example, driving the second driven element 20 pivots the second frame part 48 relative to the base 74 about the second pivot axis 52.

In an embodiment, the second transmission 24 may include more transmission stages than the first transmission 22.

In another embodiment, the first transmission 22 comprises a single transmission stage provided between the output shaft 82 of the first electromotor 100 and the first driven element 10. In such an embodiment, the second transmission 24 may comprise two transmission stages, three transmission stages, or any number of transmission stages such that the second transmission 24 includes more transmission stages than the first transmission 22. Each transmission stage may particularly be a reduction stage that reduces an output speed relative to input speed.

Hence, the first transmission may optionally comprise at most two transmission stages, such as two, or only one transmission stage, from the first electromotor output to the first driven element. In such an embodiment, the second transmission 24 may comprise three transmission stages, four transmission stages, or any number of transmission stages such that the second transmission 24 includes more transmission stages than the first transmission 22. Each transmission stage may particularly be a reduction stage that reduces an output speed relatively to input speed.

In an embodiment, the second transmission 24 comprises two transmission stages, in particular two reduction stages, for reducing an output speed of the second electromotor 200 to a reduced speed of the second driven element 20. The second transmission 24 may comprise an input transmission stage from the second electromotor output 32 to an intermediate transmission member, e.g. an intermediate shaft; and an intermediate transmission stage between the intermediate transmission member to the second driven element 20.

In an embodiment, the second transmission 24 may comprise three transmission stages, particularly three reduction stages. For example, the second transmission 24 may comprise three transmission stages as described herein: an input transmission stage 91 from the second electromotor output 201 to a primary intermediate transmission member 94, e.g. a primary intermediate shaft 60, primary worm gear 61 and primary evoloïd gear 62; an intermediate transmission stage 92 between the primary intermediate transmission member 94 and a secondary intermediate transmission member 95, e.g. a secondary intermediate shaft 21, secondary evoloïd gear 29 and second output worm 28; and an output transmission stage 93 from the secondary intermediate transmission member 95 to the second driven element 20.

In an embodiment, the second transmission 24 applies a transmission ratio of approximately 1:8. In an embodiment, an input angular speed of about 30 degrees per second is reduced to an output angular speed of about 4 degrees per second. For such transmission ratio it may be preferred for the second transmission 24 to include at least two transmission stages, such as two transmission stages, three transmission stages, or four transmission stages.

The first and second electromotors 100, 200 may be powered by a common door control module 370 of a vehicle such that the door control module 370 can control both the first electromotor 100 and the second electromotor 200. In an embodiment, the first electromotor 100 requires relatively high power, e.g. draws relatively high currents compared with the second electromotor 200. The second electromotor 200 may require only a fraction of the power consumed by the first electromotor 100. The first electromotor 100 and the second electromotor 200 may particularly be low-powered electromotors. The first electromotor 100 and the second electromotor 200 may be low-powered DC electromotors.

In accordance with the invention, the second electromotor 200 has a lower maximum power consumption, or power rating, compared to a maximum power consumption, or power rating, of the first electromotor 100. In an embodiment, the maximum power consumption of the second electromotor 200 is lower than the maximum power consumption of the first electromotor 100 by a factor in the range of 2 to 20. The maximum power consumption of the second electromotor 200 may be lower than the maximum power consumption of the first electromotor 100 by a factor of between 5 and 15. The maximum power consumption of the second electromotor 200 may be lower than the maximum power consumption of the first electromotor 100 by a factor 10. In an embodiment, the maximum power consumption of the first electromotor 100 may for example be between 10-20 Watt and the maximum power consumption of the second electromotor 200 may for example be between 1-5 Watt. In an embodiment, the maximum power consumption of the first electromotor 100 is about 12 Watt and the maximum power consumption of the second electromotor 200 is about 2 Watt.

In an embodiment, the first electromotor 100 draws between 1-2 Ampere. In an embodiment, the first electromotor 100 draws 1.5 Ampere. The second electromotor 200 may draw only a fraction of the current that the first electromotor 100 draws, for example only 50% of the current that the first actuator draws. In another embodiment, the first electromotor 100 draws at most 1 Ampere of current while the second electromotor 200 may be arranged to draw at most 0.5 Ampere of current.

In order to overcome clamping forces with which the adjustment device 44 is held in position after adjustment, using the less powerful second electromotor 200, the second transmission 24 applies in comparison with the first transmission 22 an additional speed-reduction from the second electromotor 200 to the second driven element 20. The additional reduction in speed provided by the second transmission 24 comes with an increased torque transmission from the second electromotor 200 to the second driven element 20. The adjustment device 44 may accordingly include only a single relatively high-powered electromotor, e.g. the first electromotor 100 and one relatively low-powered electromotor, e.g. the second electromotor 200. The second electromotor 200 having a relatively low power rating, may be less costly, and may have a smaller form factor compared to high power-rated electromotors for enabling miniaturization of the adjustment device 44. Also, power consumption of the adjustment device 44 may be reduced. Advantageously, the adjustment device 44 may be controlled by a modern standard door control module of a vehicle, which has only one high-power control output. The first electromotor 100 having the relatively high-power rating can accordingly be controlled by the only one high-power control output of the modern standard door control module, while the second electromotor 200 having the relatively low power rating can be controlled by a low-power control output of the modern standard door control module of the vehicle.

In an embodiment, to account for the reduced power of the second electromotor 200, the second transmission is operationally arranged between the second electromotor 200 and the second driven element 20, where the second transmission 24 trades-off adjustment speed about the second pivot axis 52 for a torque increase at the second driven element 20.

In an embodiment, it is acceptable to have a relatively low adjustment speed about one of the two pivot axes 50, 52. In an embodiment, the relatively low adjustment speed may be about a horizontally extending pivot axis. In such an embodiment, the first pivot axis 50 may then correspond to a power fold axis, about which the adjustment frame 46, 48 is pivoted from a folded position to an extended position. This way, the power fold actuation can be driven by the relatively high-powered electromotor, for example the first electromotor 100, with a relatively high adjustment speed. The first pivot axis 50 may thus for example extend vertically in use. The second pivot axis 52 may for example extend non-parallel to the first pivot axis 50. In an embodiment, the second pivot axis 52 may extend transverse to the first pivot axis 50. In an embodiment, the second pivot axis 52 may extend horizontally.

In an embodiment, the electromotors 100, 200 are arranged in a standing position, where the electromotor outputs are rotatably driven about parallel axes. The electromotors 100, 200 may extend vertically and parallel to the first pivot axis 50. It is appreciated that other orientations of the electromotors 100, 200 are also possible.

Figure 4:
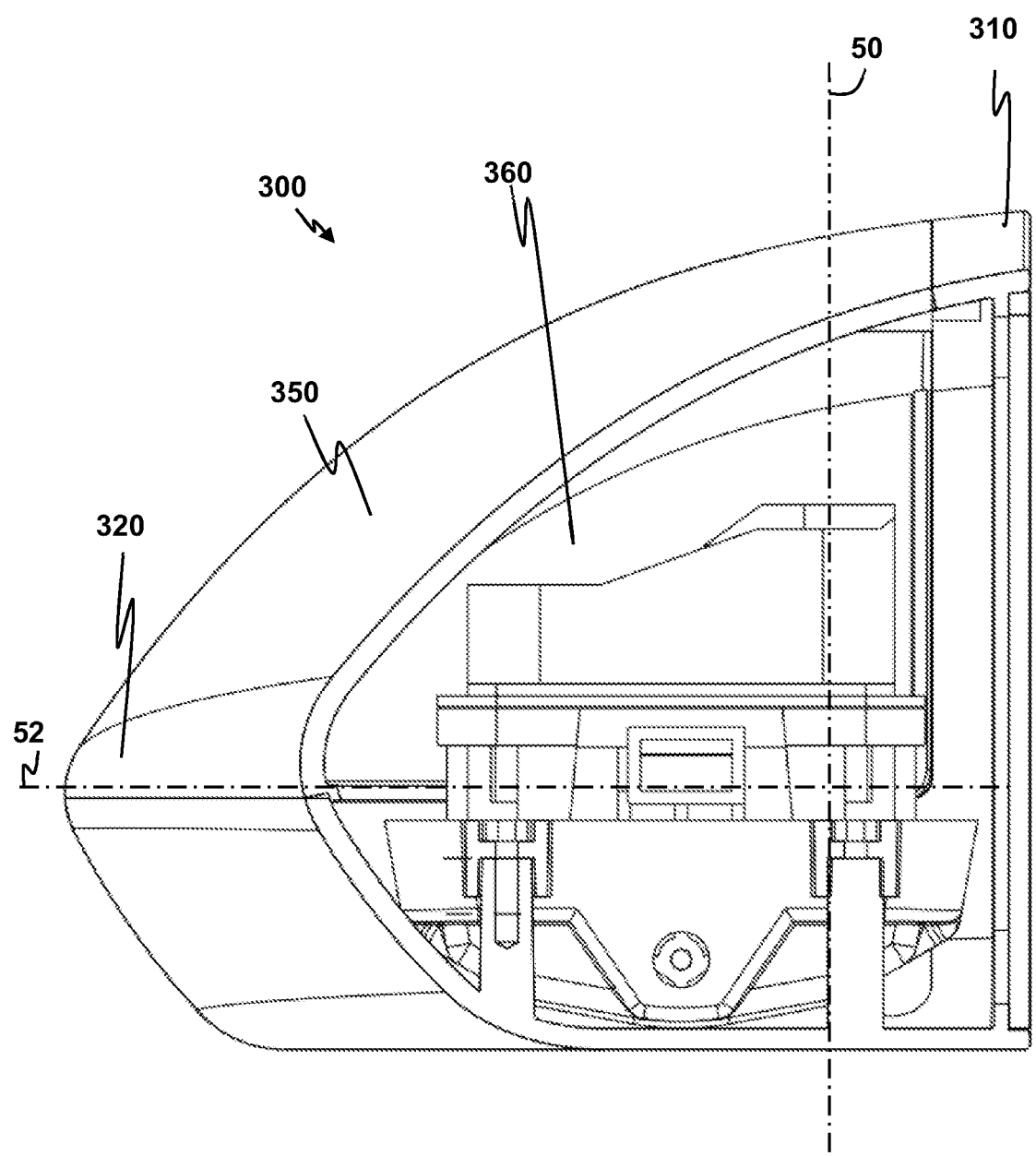
FIG. 4 shows an example of an external vision unit.

FIG. 4 shows an example of an external vision unit 300 for a vehicle having shell-shaped cover 350 that defines a cavity 360 for holding the drive unit of the adjustment device 44. The shell-shaped cover 350 may also cover a vision element (not shown), such as a mirror, camera, LIDAR and/or display.

Optionally, the frame 46, 48 comprises a shell-shaped cover 350 which defines a cavity 360 for holding the drive unit. In an embodiment, the shell-shaped cover 350 is part of the frame 46, 48, or may be fixed or coupled thereto. In an embodiment, the shell-shaped cover 350 is integrally formed with the second frame part 48, or may be fixed or coupled thereto.

In some implementations, the vision element is coupled to the frame 46, 48 for being adjusted about the first and second pivot axes 50, 52. In an embodiment, the vision element may specifically be coupled to the second frame part 48. The first pivot axis 50 and the second pivot axis 52 may extend non-parallel to each other. In an embodiment, the first pivot axis 50 corresponds to a power fold axis, e.g. a vertical axis, about which the external vision unit is pivoted between a folded position and an extended position. The second pivot axis 52 may be substantially transverse to the first pivot axis 50.

The shell-shaped cover 350 has a proximal end 310, in use proximate the vehicle while in use, and a distal end 320 opposite the proximal end 310. In an embodiment, the shell-shaped cover 350 may delimit an asymmetrically shaped cavity 260. In such an example, as illustrated in FIG. 4, the shell-shaped cover 350 is tapered towards the distal end 320, primarily for improving aerodynamic properties. Hence, a tapered distal end 320 may have little room for accommodating an electromotor and transmission coupled thereto. However, in an embodiment, the first and second electromotors 100, 200 may be arranged adjacent each other in the cavity 360, such that the first electromotor 100 may be accommodated in the cavity 360 nearer the proximal end 310 and the second electromotor 200, being relatively low powered and of smaller form compared with the first electromotor 100, may be accommodated nearer the distal end 320 of the shell-shaped cover 350.

In an embodiment, an output axis of the first electromotor 102 is parallel to the first pivot axis 50. In an embodiment, the output axis of the first electromotor 102 is parallel to the first pivot axis 50 and an output axis of the second electromotor 202 extends parallel to the first pivot axis 50. For a particular compact setup, the second electromotor 200 may be arranged in the cavity 360 in an orientation where the output axis of the second electromotor 202 extends transverse to the first pivot axis 50, e.g. parallel to the second pivot axis 52. In an embodiment, the output axis of the first electromotor 102 is parallel to the first pivot axis 50 and an output axis of the second electromotor 202 extends parallel to the second pivot axis 52.

In an embodiment, the second electromotor volume is smaller than the first electromotor volume by a factor of between 1.1 and 4. In an embodiment, the second electromotor volume is 50% less than the first electromotor volume. The saved space from the smaller electromotor 200 may, for example, be occupied by additional components of the second transmission 24 for providing a suitable speed reduction ratio. These additional components may include additional intermediate members forming additional transmission stages. These additional components may also include additional gearings or evoloïd gearings having varying numbers of teeth accordingly.

The adjustment device 44 is movable between a folded position, in which the frame 46, 48 extends substantially parallel to the vehicle, and an extended position in which the frame 46, 48 extends substantially outward from the vehicle. The adjustment device can be moved between the folded and the extended position by pivoting the frame 46, 48 relative to the base 74 about the first pivot axis 50.

Figure 5A:
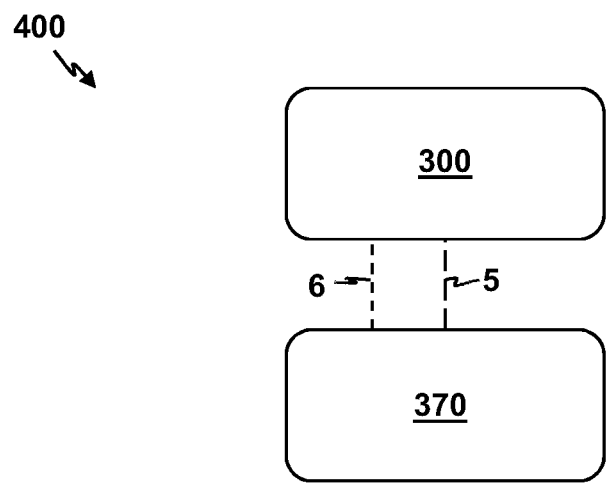
FIG. 5A shows an example of an external vision unit system.
Figure 5B:
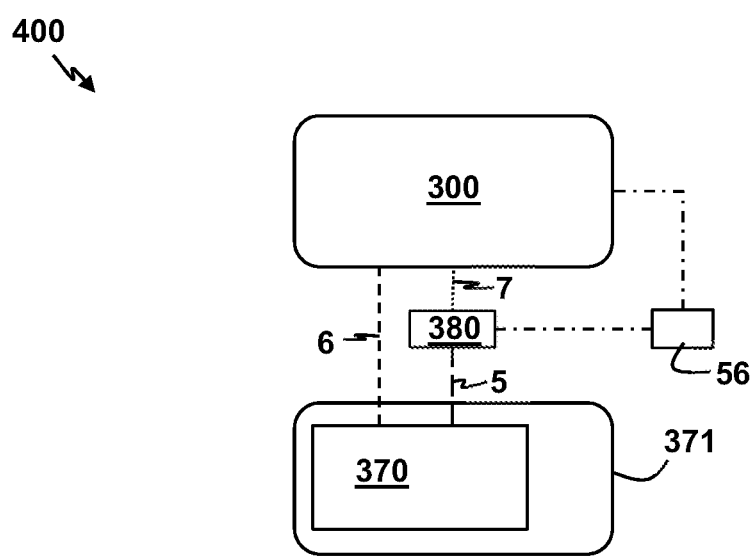
FIG. 5B shows an example of an external vision unit system.

The external vision unit 300 may be part of an external vision unit system 400 of a vehicle 371 as exemplified in FIGS. 5A and 5B. The system comprises the external vision unit 300 and a control module, particularly a door control module 370 of the vehicle 371. The door control module 370 is connected for controlling an orientation of the external vision unit 300 relative to the vehicle 371. The door control module 370, may be connected to the adjustment device 44 to send a power signal to the adjustment device 44.

In an embodiment, the door control module 370 may be arranged to send a power signal to the adjustment device 44 for powering the first electromotor 100 and/or the second electromotor 200. The door control module 370 may for example send a high-power signal 5 to the first electromotor 100 of the external vision unit 300, and a low-power signal 6 to the second electromotor 200 of the external vision unit 300.

In an embodiment, the door control module 370 may for example be configured to selectively send a first power signal to the first electromotor 100 for operating the first electromotor 100 at a first speed and a second power signal to the first electromotor 100 for operating the first electromotor 100 at a second, lower, speed. The second power signal may be effectively lower than the first power signal, for selectively operating the first electromotor 100 at different speeds. Hence, the door control module 370 may be considered to provide a virtual transmission for the first powertrain, which is selectively operable according to at least two virtual transmission ratios. A first of the two virtual transmission ratios may be associated with the first power signal, and a second one of the two virtual transmission ratios may be associated with the second, lower, power signal. Such embodiment of the system may include the prior art adjustment device 144, the adjustment device 44 as described herein, or another adjustment device.

In an embodiment, the second power signal may be a modulated power signal 7, such as a pulse-width modulated power signal, for reducing an average power supply to the first electromotor 100. In an embodiment, the door control module 370 is configured to reduce the power supply to the first electromotor 100, e.g. by means of pulse width modulation or voltage reduction, only in case the frame 46, 48 is within a predefined angular range of positions about the first pivot axis 50, for example if frame 46, 48 is close to the extended position, to reduce the adjustment speed about the first pivot axis 50 within this range of positions. Hereto, the system 400 may comprise a sensor 56 for sensing a position of the frame 46, 48, particularly of a position of the first frame part 46 relative to the base 74 and/or the first frame part 46 relative to the second frame part 48. In an embodiment, the sensor 56 comprises a potentiometer or ripple counter, for determining a position of the frame 46, 48 relative to the base 74. The door control module 370 may be connected to the sensor 56, and configured to receive a sensor signal from the sensor 56 indicative of the position of the frame 46, 48. The door control module 370 may be configured to modulate the received power signal, and send the modulated power signal to the first electromotor 100, for example, based on the received sensor signal.

In an embodiment, the system comprises an intermediate control unit 380 interconnected between the door control module 370 and the first electromotor 100 and/or the second electromotor 200, as exemplified in FIG. 5B. The intermediate control unit may be considered part of the external vision unit 300. It may for example be accommodated within the cavity 360 formed by the shell-shaped cover 350. In an embodiment, the intermediate control unit 380 is configured to modulate a power signal 5 from the door control module 370 to the first electromotor 100 and/or the second electromotor 200. For example, the intermediate control unit 380 may be configured to receive a power signal 5 from the door control module 380, and, based on the received power signal 5, send a modulated power signal 7 to the first electromotor 100. In an embodiment, the modulated signal 7 may have a lower power than the received power signal 5. For example, the intermediate control unit 380 may reduce a voltage of the power signal 5 received from the door control module. In an embodiment, the modulated signal is a pulse-modulated signal, such as a pulse-width-modulated signal.

In an embodiment, the intermediate control unit 380 is configured to send the modulated power signal 7 to the first electromotor 100, further based on a position of the frame 46, 48, for example a position of the first frame part 46 relative to the base 74 and/or relative to the second frame part 48. In an embodiment, the intermediate control unit 380 may be configured to only reduce the power supply to the first electromotor 100 in case the frame 46, 48 is within a predefined angular range of positions about the first pivot axis 50, for example close to the extended position, to reduce the adjustment speed about the first pivot axis 50 within this range of positions. Hereto, the system 400 may comprise a sensor 56 for sensing a position of the frame 46, 48. In an embodiment, the system 400 may comprise a sensor 56 for sensing a position of the first frame part 46 relative to the base 74 and/or the first frame part 46 relative to the second frame part 48. The intermediate control unit 380 may be connected to the sensor 56, and configured to receive a sensor signal from the sensor 56 indicative of the position of the frame 46, 48. The intermediate control unit 380 may be configured to modulate the received power signal 5, and send the modulated power signal 7 to the first electromotor 100, based on the received sensor signal 5.

Herein, the invention is described with reference to specific examples of embodiments of the invention. One of ordinary skill in the art will appreciate that various modifications and changes may be made therein, without departing from the essence of the invention. For the purpose of clarity and a concise description, features are described herein as part of the same or separate embodiments; however, alternative embodiments having combinations of all or some of the features described in these separate embodiments are also envisaged.

Other modifications, variations, and alternatives are also possible. The specifications, drawings and examples are, accordingly, to be regarded in an illustrative sense rather than in a restrictive sense.

For the purpose of clarity and a concise description, features are described herein as part of the same or separate embodiments; however, it will be appreciated that the scope of the invention may include embodiments having combinations of all or some of the features described.

In the claims, the word "comprising" does not exclude the presence of other features or steps not listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. An adjustment device for adjusting an orientation of a vision element of a vehicle about a first pivot axis and a second pivot axis, the adjustment device comprising:
    a base for coupling to the vehicle;
    a frame pivotably coupled to the base, the frame having a first frame part being pivotable relative to the base about the first pivot axis and a second frame part being pivotable relative to the first frame part about the second pivot axis; and
    a drive unit for driving the frame pivotally about the first pivot axis and the second pivot axis;
    wherein the drive unit comprises a first powertrain operationally between the first frame part and the base, having a first electromotor connected via a first transmission to a first driven element for driving the first frame part relative to the base about the first pivot axis, and a second powertrain operationally between the first frame part and the second frame part, having a second electromotor connected via a second transmission to a second driven element for driving the second frame part relative to the first frame part about the second pivot axis;
    wherein a power rating of the second electromotor is lower than a power rating of the first electromotor; and
    wherein the second transmission applies a second speed-reducing transmission ratio from the second electromotor to the second driven element, the second speed-reducing transmission ratio providing a greater speed reduction than a first transmission ratio from the first electromotor to the first driven element.

2. The device of claim 1, wherein the second electromotor has a smaller form factor compared to the first electromotor.

3. The device of claim 2, wherein the second electromotor volume is smaller than the first electromotor volume by a factor of between 1.1 and 4.

4. The device of claim 1, wherein the maximum power consumption of the second electromotor is lower than the maximum power consumption of the first electromotor by a factor of between 1.1 and 4.

5. The device of claim 1, wherein the first electromotor and the second electromotor are powered by a common door control module of the vehicle.

6. The device of claim 1, wherein the first electromotor and the second electromotor are low-powered electromotors.

7. The device of claim 1, wherein a maximum combined current consumption of the first electromotor and the second electromotor is between 1 and 2 Ampere.

8. The device of claim 7, wherein a maximum combined current consumption of the first electromotor and the second electromotor is 1.5 Ampere.

9. The device of claim 1, wherein the first pivot axis and the second pivot axis are non-parallel to each other.

10. The device of claim 1, wherein the second transmission comprises at least three reduction stages for reducing an output speed of the second electromotor to reduce speed of the second driven element.

11. The device of claim 10, wherein the second transmission comprises a second input transmission stage from the second electromotor output to a second transmission primary intermediate member, an intermediate transmission stage from the second transmission primary intermediate member to a second transmission secondary intermediate member, and a second output transmission stage from the second transmission secondary intermediate member to the second driven element.

12. The device of claim 11, wherein the second transmission includes an evoloïd and/or an evoloïd gear.

13. The device of claim 1, wherein the first transmission comprises a single transmission stage from the first electromotor output to the first driven element.

14. The device of claim 1, wherein the first transmission comprises two transmission stages from the first electromotor output to the first driven element.

15. The device of claim 1, wherein the first frame part is pivotable relative to the base about the first pivot axis, and/or the second frame part is pivotable relative to the first frame part about the second pivot axis.

16. The device of claim 1, wherein an output axis of the first electromotor is parallel to the first pivot axis and/or an output axis of the second electromotor is parallel to the first pivot axis.

17. The device of claim 1, wherein an output axis of the first electromotor is parallel to the second pivot axis and/or an output axis of the second electromotor is parallel to the second pivot axis.

18. The device of claim 1, wherein:
the frame comprises a shell-shaped cover which defines a cavity for holding the drive unit;
the shell-shaped cover comprises a proximal end located proximate the vehicle and a distal end opposite the proximal side; and
the first electromotor and the second electromotor are arranged adjacent each other in the cavity, the first electromotor at the proximal side and the second electromotor at the distal side.

19. An external vision unit for a vehicle, comprising:
an adjustment device for adjusting an orientation of an external vision unit of a vehicle about a first pivot axis and a second pivot axis, the adjustment device comprising:
a base for coupling to the vehicle;
a frame pivotably coupled to the base, the frame having a first frame part being pivotable relative to the base about the first pivot axis and a second frame part being pivotable relative to the first frame part about the second pivot axis; and
a drive unit for driving the frame pivotally about the first pivot axis and the second pivot axis;
wherein the drive unit comprises a first powertrain operationally between the first frame part and the base, having a first electromotor connected via a first transmission to a first driven element for driving the first frame part relative to the base about the first pivot axis, and a second powertrain operationally between the first frame part and the second frame part, having a second electromotor connected via a second transmission to a second driven element for driving the second frame part relative to the first frame part about the second pivot axis;
wherein a power rating of the second electromotor is lower than a power rating of the first electromotor; and
wherein the second transmission applies a second speed-reducing transmission ratio from the second electromotor to the second driven element, the second speed-reducing transmission ratio providing a greater speed reduction than a first speed-reducing transmission ratio from the first electromotor to the first driven element; and
a vision element mounted to the frame.

20. The external vision unit of claim 19, wherein:
the second electromotor has a smaller form factor compared to the first electromotor;
the maximum power consumption of the second electromotor is lower than the maximum power consumption of the first electromotor by a factor of between 1.1 and 4;
the first electromotor and the second electromotor are low-powered electromotors;
a maximum combined current consumption of the first electromotor and the second electromotor is between 1 and 2 Ampere;
the first pivot axis and the second pivot axis are non-parallel to each other;
the second transmission comprises a plurality of reduction stages for reducing an output speed of the second electromotor to reduce speed of the second driven element; and
the first frame part is pivotable relative to the base about the first pivot axis, and/or the second frame part is pivotable relative to the first frame part about the second pivot axis.

21. An external vision unit system for a vehicle, comprising:
an adjustment device for adjusting an orientation of an external vision unit of a vehicle about a first pivot axis and a second pivot axis, the adjustment device comprising:
a base for coupling to the vehicle;
a frame pivotably coupled to the base, the frame having a first frame part being pivotable relative to the base about the first pivot axis and a second frame part being pivotable relative to the first frame part about the second pivot axis; and
a drive unit for driving the frame pivotally about the first pivot axis and the second pivot axis;
wherein the drive unit comprises a first powertrain operationally between the first frame part and the base, having a first electromotor connected via a first transmission to a first driven element for driving the first frame part relative to the base about the first pivot axis, and a second powertrain operationally between the first frame part and the second frame part, having a second electromotor connected via a second transmission to a second driven element for driving the second frame part relative to the first frame part about the second pivot axis;
wherein a power rating of the second electromotor is lower than a power rating of the first electromotor; and
wherein the second transmission applies a second speed-reducing transmission ratio from the second electromotor to the second driven element, the second speed-reducing transmission ratio providing a greater speed reduction than a first speed-reducing transmission ratio from the first electromotor to the first driven element;
a door control module operatively connected to the adjustment device to send a power signal to the adjustment device, and,
a vision element mounted to the frame.

* * * * *